US007215648B2

(12) United States Patent
Sullivan (10) Patent No.: US 7,215,648 B2
(45) Date of Patent: May 8, 2007

(54) APPARATUS AND METHOD FOR EFFICIENT LIVE WEBCASTING AND NETWORK CONNECTIVITY

(75) Inventor: Mark Sullivan, Joplin, MO (US)

(73) Assignee: Varitek Industries, Inc., Houston, TX (US)

( * ) Notice: Subject to any disclaimer, the term of this patent is extended or adjusted under 35 U.S.C. 154(b) by 1001 days.

(21) Appl. No.: 09/966,325

(22) Filed: Sep. 28, 2001

(65) Prior Publication Data

US 2003/0035386 A1 Feb. 20, 2003

Related U.S. Application Data

(60) Provisional application No. 60/290,372, filed on May 11, 2001.

(51) Int. Cl.
*H04B 7/005* (2006.01)
(52) U.S. Cl. ........................ 370/278; 370/312
(58) Field of Classification Search ........ 370/276–278, 370/310, 312, 351, 357, 359, 389, 390, 395.52; 455/39, 68, 69; 725/63, 64, 67, 68, 105, 725/109
See application file for complete search history.

(56) References Cited

U.S. PATENT DOCUMENTS

| | | | | |
|---|---|---|---|---|
| 4,801,940 A | * | 1/1989 | Ma et al. ..................... | 342/359 |
| 5,392,451 A | * | 2/1995 | Schwendeman et al. ... | 455/13.1 |
| 5,592,176 A | * | 1/1997 | Vickers et al. .............. | 342/359 |
| 5,689,648 A | | 11/1997 | Diaz et al. | |
| 5,903,621 A | | 5/1999 | Rebec et al. | |
| 5,987,233 A | | 11/1999 | Humphrey | |
| 5,991,596 A | | 11/1999 | Cunningham et al. | |
| 6,016,120 A | * | 1/2000 | McNabb et al. ........ | 342/357.06 |
| 6,020,845 A | | 2/2000 | Weinberg et al. | |
| 6,049,561 A | * | 4/2000 | Pezzlo et al. ................ | 375/132 |
| 6,078,961 A | | 6/2000 | Mourad et al. | |
| 6,101,180 A | | 8/2000 | Donahue et al. | |
| 6,105,060 A | | 8/2000 | Rothblatt | |
| 6,160,797 A | | 12/2000 | Robert, III et al. | |

(Continued)

OTHER PUBLICATIONS

"A Comparison of Mechanisms for Improving TCP Performance Over Wireless Links," by Hari Balakrishnan, Venkata N. Padmanabhan, Srinivasan Seshan and Randy H. Katz; *IEEE/ACM Transactions on Networking*, vol. 5, No. 6, Dec. 1997.

(Continued)

*Primary Examiner*—Dmitry Levitan
(74) *Attorney, Agent, or Firm*—Senniger Powers (57) ABSTRACT

An apparatus and method for providing efficient connectivity to the Internet via a satellite communication link. A particularly useful embodiment of the invention comprises a an apparatus and method for webcasting live events over a satellite communication link. Digital multimedia data is converted to a bitstream format by an encoder. The encoder supplies the bitstream data to an uplink subsystem for transmission to a satellite. The satellite retransmits the data to a ground-based facility which makes the content available to subscribers over the Internet, either directly or through an independent Content Delivery Network. A novel TCP proxy process adjusts for propagation delays associated with the satellite path. Preferably, the TCP proxy resides in the uplink and the ground-based receiver that receives the bitstream data that is transported by the satellite, or by a router configured to provide such a TCP proxy process.

11 Claims, 5 Drawing Sheets

U.S. PATENT DOCUMENTS

| | | | |
|---|---|---|---|
| 6,161,141 A * | 12/2000 | Dillon | 709/230 |
| 6,169,877 B1 | 1/2001 | Gulla' | |
| 6,172,972 B1 | 1/2001 | Birdwell et al. | |
| 6,175,717 B1 | 1/2001 | Rebec et al. | |
| 6,205,473 B1 | 3/2001 | Thomasson et al. | |
| 6,205,485 B1 | 3/2001 | Kikinis | |
| 6,272,316 B1 * | 8/2001 | Wiedeman et al. | 455/13.1 |
| 6,584,083 B1 * | 6/2003 | Toporek et al. | 370/316 |
| 6,741,555 B1 * | 5/2004 | Li et al. | 370/229 |
| 6,757,248 B1 * | 6/2004 | Li et al. | 370/235 |
| 6,792,615 B1 * | 9/2004 | Rowe et al. | 725/37 |
| 6,801,576 B1 * | 10/2004 | Haldeman et al. | 375/240.29 |
| 6,856,599 B1 * | 2/2005 | Kroon | 370/236 |

OTHER PUBLICATIONS

"Parity-Based Loss Recovery for Reliable Multicast Transmission," by Jörg Nonnenmacher, Ernst W. Biersack and Don Towsley; *IEEE/ACM Transactions on Networking*, vol. 6, No. 4, Aug. 1998.

* cited by examiner

FIG. 5

APPARATUS AND METHOD FOR EFFICIENT LIVE WEBCASTING AND NETWORK CONNECTIVITY

CROSS-REFERENCE TO RELATED APPLICATIONS

The invention of the present application claims priority based on Provisional Application Ser. No. 60/290,372, filed on May 11, 2001, the entirety of which is incorporated herein by reference for all purposes.

BACKGROUND OF THE INVENTION

The invention relates generally to network connectivity and web casting. In particular, the invention relates to an improved apparatus and method for Internet connectivity and streaming video and/or audio media over the Internet using a satellite communication link.

"Webcasting" involves the transmission of streaming video and/or audio media to remote computers via a global computer network, such as the Internet. Transmission over the Internet of live video and/or audio of an event, in real-time, such that viewers are seeing the live event as it happens, with typically a few seconds and at most a few minutes of propagation delay is considered "live web casting."

The problem of delivering broadband content to a subscriber/end user has been described as "the last mile problem" because the subscriber/end user computer typically operates at the slowest data transfer rate in the communication path. It is believed, however, that most broadband solutions are asymmetric, delivering high data rates to the subscriber, but using a relatively small amount of bandwidth from the subscriber. In many situations, this reflects an appropriate arrangement because the subscriber sends data requiring a relatively small amount of bandwidth (e.g., email and mouse click information), yet receives high bandwidth content such as images, sounds, movies, and the like. Web casting, in contrast, produces a somewhat different problem because a high bandwidth output is required from the webcast site to the Internet Service Provider (ISP). Thus, it is believed that none of the presently available broadband access products, which are largely asymmetric, including DSL, cable modems, proprietary systems, and the like represent an adequate solution. As such, the need for high bandwidth from the webcast site may be referred to as a "first mile problem." The present invention teaches a solution to this "first mile problem."

Originating a webcast requires a connection to the public Internet with enough bandwidth to support the transmission. The bandwidth required can be high because it is common practice to encode the same content in various formats, each supporting a different rate of connection to the end user. For example, a program might be concurrently encoded at 300 Kb/s for broadband subscribers, 120 Kb/s for ISDN users, 36 Kb/s for higher speed modem users, and 19 Kb/s for everybody else. Thus, webcasting such an event requires a total of 475 Kb/s or more. To webcast a live event, this level of connectivity must be available at the event site or some arrangement must be made to move the content to a location with sufficient connectivity. Such a data rate must be sustained over the duration of the event for optimum webcasting. An average data rate of 475 Kb/s, where this is achieved with a high burst rate and periods of lost packets, would be acceptable for most Internet applications such as the transfer of files and the delivery of email, but such a rate is not adequate for webcasting.

Due to the lack of high speed connectivity, especially in the remote-to-Internet direction, from venues such as stadiums, concert halls, sports fields, and the like, current live webcasts are often made with live audio only, and sometimes with the addition of frequently updated still pictures. So-called "live" video and audio webcasts have been made by ferrying video tapes from a venue to the studio but these are not really "live." Truly live webcasts can been made by using a standard television uplink truck in connection with a geosynchronous satellite to move the produced video program to the studio for web encoding and distribution. This is believed to be the only current method with the same universal coverage as the invention disclosed herein below, and this current method is dramatically more expensive due to the need to rent a satellite transponder to transport the program. For technical reasons (e.g., the transponder becomes saturated by the analog video signal), this method occupies a full satellite transponder at a cost typically in excess of six hundred dollars per hour.

For these reasons, an improved apparatus and method for webcasting from a remote venue is desired. Such an apparatus and such a method benefits from the use of geosynchronous satellite bandwidth, but by its novel and advantageous architecture, enables webcasting using only a fraction of a transponder's bandwidth, freeing the balance for use by other applications, such as, for example, additional concurrent webcasts.

SUMMARY OF THE INVENTION

The improved apparatus and method also provide high speed Internet access anywhere. The improved apparatus and method create an economic market for efficiently webcasting events to a relatively small group of remotely located subscribers, when such events might not otherwise generate sufficient broad-based support to warrant broadcasting by means already available in the prior art. Such events could include, for example, sporting events, entertainment events, business meetings, stockholder meetings, family gatherings, and the like.

One aspect of the invention is a satellite uplink for use in connection with a webcasting system for capturing live media content at a first location and webcasting the live media content to a second location. Such a webcasting system includes a satellite communication link that has a propagation delay, a communication satellite, an encoder encoding the live media content into a first webcast format at the first location. The first webcast format is sensitive to the transmission propagation delay and requires at least one transmission acknowledgment signal. The uplink comprises a control processor that receives the live media content in the first webcast format and provides the at least one transmission acknowledgment signal to the encoder. The control processor converts the live media content to a second webcast format having a characteristic such that the second webcast format is insensitive to the transmission propagation delay. A satellite communications signal converter receives the live media content in the second webcast format. The satellite communications signal converter converts the live media content received in the second webcast format to a satellite transmission signal compatible with the satellite communication link. A satellite transceiver receives the satellite transmission signal and transmits the satellite transmission signal to the satellite over the satellite communication link. The satellite downlinks the satellite transmission signal for reception on the earth at the second location.

Another aspect of the invention includes a webcasting system for webcasting media content over a satellite communication link having a transmission propagation delay and including a communication satellite. The webcasting system comprises an encoder that encodes the media content into a first digital webcast signal having a first digital webcast format that is sensitive to the transmission propagation delay. The encoder requires receipt of at least one transmission acknowledgment signal. An uplink router comprises a control processor that receives the first digital webcast signal and provides the at least one transmission acknowledgment signal to the encoder. The control processor converts the first digital webcast signal to a second digital webcast signal that is insensitive to the transmission propagation delay. A satellite communications signal converter receives the second digital webcast signal. The satellite communications signal converter converts the second digital webcast signal into a satellite transmission signal. A satellite transceiver receives the satellite transmission signal and transmits the satellite transmission signal to the satellite such that the satellite downlinks the satellite transmission signal for reception on the earth.

In still another aspect, the invention includes a method of webcasting media content over a satellite communication link that has a transmission propagation delay and includes a communication satellite. The method comprises encoding the media content into a first digital webcast signal having a first digital webcast format that is sensitive to the transmission propagation delay. The first digital webcast format requires the receipt of at least one transmission acknowledgment signal. The encoded media content is uplinked across the satellite communication link by an uplink method. The uplink method comprises receiving the first digital webcast signal. The at least one transmission acknowledgment signal required by the first webcast format is provided. The first digital webcast signal is converted to a second digital webcast signal that is insensitive to the transmission propagation delay of the satellite communication link. The second digital webcast signal is converted into a satellite transmission signal. The satellite transmission signal is transmitted to the communication satellite. The satellite transmission signal is downlinked for reception on the earth.

In yet another aspect, the invention comprises one or more computer-readable media having computer executable instructions for performing the above-mentioned method of webcasting media content.

BRIEF DESCRIPTION OF THE DRAWINGS

Corresponding reference characters indicate corresponding parts throughout the drawings.

DETAILED DESCRIPTION OF PREFERRED EMBODIMENTS

Before turning to the figures, a rather detailed overview of various aspects of preferred embodiments of the invention is provided for purposes of context, clarity, and completeness.

Briefly stated for contextual purposes, a fundamental difference between the present apparatus and method and other, prior art methods of webcasting by satellite, is that the present apparatus and method teaches encoding and compression of the program content into webcast bitstreams at the venue, and the transport of these digital bitstreams over the satellite, rather than transporting the analog video program over the satellite. To do so requires a satellite terminal with adequate inroute (i.e. venue to Internet) bandwidth as generally discussed above. Present satellite Internet terminals suffer two inadequacies in this respect. First, if they have high enough bandwidth at all, which is only true of a small subset of the equipment available (perhaps Gilat STARBAND, Hughes DIRECPC), it is in the outroute (i.e. Internet to venue) direction. Second, the inroute bandwidth, even at the limited rate, is typically assigned in a shared mode so there is not a reliable inroute connection of consistent propagation delay and reliable packet delivery at any speed. It is believed that the currently available products have advertised an uplink rate of 128 Kb/s or more. Not only is such performance considered inadequate for present purposes, it may not be available because the 128 Kb/s rate is believed to reflect a statement of the aggregate throughput of all terminals using a particular frequency. The stated data rate is simply not available to any single terminal for several seconds at a time let alone the hours or even minutes of sustained operation required for webcasting a typical event.

The present invention includes a portable satellite terminal that overcomes both of these limitations and provides a high-speed, reliable inroute connection. While it is of secondary importance in a webcasting application, the present invention also features a high-speed outroute channel, which is shared with concurrent users as is appropriate in this application since the outroute is not used to carry the critical webcast bitstream, only management and collateral information.

The following list of equipment is exemplary of the remote site equipment used to support a webcast in accordance with a preferred embodiment of the present invention.

Video camera(s) and microphone(s);

Video switching equipment;

Video digitizing and compression equipment (typically in the form of a general-purpose computer running specialized software; digital cameras may also be used to provide digital video);

Satellite uplink apparatus;

Optionally, still cameras and computers for capturing and editing auxiliary information to be webcast along side the live video/audio stream; and Optionally, portable equipment for the generation of electrical power (e.g., an engine driven generator and/or a set of batteries).

Live images and sounds are captured by the video cameras and microphones. One or more cameras and microphones may be employed. In the case of multiple cameras, a person preferably operates a video switcher and selects, in real time, which camera signal(s) to use. It is also possible to configure the system such that some or all of the raw camera feeds are webcast, enabling the viewer to choose which angle on the event to view. The video signal from the switcher (and, optionally, those from the cameras), is digitized, if it is not already in digital form, and fed to a computer running webcast encoding and compressing software, which may be in the form of a dedicated encoder box or a PC running the encoding and compressing software. The primary webcast formats at this time are REAL MEDIA, WINDOWS MEDIA, and QUICKTIME with encoders provided by Real Networks, Microsoft, and Apple Computer respectively. It may even be desirable to encode a program in more than one of these formats in order to support the broadest possible range of viewers. The encoding process results in a stream of IP (Internet Protocol) packets. These are preferably transmitted over an Ethernet, either wired or wireless, to the satellite uplink. Some webcasting formats, including REAL MEDIA in a server-to-server connection may use a unidirectional transfer via the user datagram protocol (UDP) of the IP family. This requires no special handling and may be directly transmitted over the satellite link.

On the other hand, some formats, including WINDOWS MEDIA or REAL MEDIA in an encoder-to-server connection, use the two-way communications or use the transmission control protocol (TCP) to transport the webcast bitstream. This case requires some special handling within the satellite uplink router. Unlike the unidirectional UDP protocol, which allows a packet to be lost, bidirectional protocols, including both UDP and TCP-based protocols, provide for reliable delivery of the bitstream. This is accomplished by a system of acknowledgments and retransmission. TCP also includes mechanisms to regulate the flow of data so that a fast sender does not overwhelm a slow receiver or slow intermediate links in the network. The long propagation delay of the geosynchronous satellite link (approximately 500 ms round-trip) confuses the flow control mechanisms of the TCP protocol and therefore limits the data rate that it can support. Similarly, the propagation delay can interfere with the proper operation of bi-directional protocols based on UDP (exemplified by REAL MEDIA's encoder-to-server protocol). This propagation delay problem is believed to be a primary reason current practice does not include on-site encoding and, thus, economical webcast transmission over satellite in digital form. Accordingly, such protocols that are confused by long propagation delays may be characterized as sensitive to transmission propagation delays in that such protocols may not effectively work at full speed with the relatively long propagation delays associated with satellite communications. Conversely, a protocol that permits full speed transmission without being confused or hampered by the relatively long propagation delays associated with satellite communications may be characterized as insensitive to such delays. Therefore, the present invention's solution to the propagation delay problem is novel, valuable, and provides significant advantages.

To overcome the propagation delay problem, the invention uses a TCP proxy process to locally generate acknowledgment packets for the webcast encoding computer so it will be able to transmit the webcast bitstream at full speed. In the preferred embodiment, this is accomplished by having the uplink router serve as the endpoint of the TCP circuit (i.e., as a "proxy" for the webcasting server) and forward only the data over the satellite link in a protocol insensitive to the long propagation delay. At the receiving end of the satellite link, a matching process receives the data and transmits it to the webcasting server (i.e., as a "proxy" for the encoder") using the standard TCP protocol. The protocol used over the satellite link may be anything convenient as it never leaves the closed satellite network so it does not need to support compatibility outside of that system. In the preferred embodiment, this protocol is actually a modified version of the TCP protocol, so chosen because either proxy can communicate with a standard TCP device, providing additional flexibility for the system.

A preferred embodiment of a satellite uplink apparatus suitable for use with the present invention includes a plurality of features and elements. A specialized computer (referred to as a "router") executes software that provides the following functions: user interface; antenna pointing and peaking processing; performance monitoring and safety cutoff monitoring; bandwidth monitoring and capacity request processes; power control and tuning command monitoring; addressed packets selecting from downlink stream; TCP/IP proxy processing; and inroute packets formatting for uplink. The uplink apparatus also preferably includes a satellite receiver and demodulator; a satellite modulator; a low-noise receive amplifier and downconverter; an upconverter; a high-power transmit amplifier; a dish antenna with feedhorn, orthomode coupler, positioning motors and attitude sensors; a Global Positioning System (GPS) receiver and antenna; an electronic compass; an Ethernet interface (optionally wireless); and power supplies for the above, preferably one for the computer and one for the transmit amplifier. All or substantially all of the above-noted hardware is preferably mounted in a rugged, portable case.

The far end of the communication link through the satellite is a teleport or earth station. This station preferably includes a large, high-gain dish antenna for sending signals to and receiving signals from a satellite, modulators and demodulators, and computers to implement the encoding and control programs. The teleport is responsible for allocating satellite bandwidth to the various portable terminals dynamically, adapting an overall bandwidth plan to the inroute bandwidth requirements of each remote terminal while staying within the limited total bandwidth available from the satellite.

A preferred teleport system includes a plurality of components. Inroute allocation computer with software supports the following functions: maintaining a list of all currently operating remote terminals; assigning an inroute router (below) and some satellite bandwidth to each remote terminal; monitoring the dynamic inroute usage of each remote terminal; accepting manually entered requests for minimum static bandwidth (i.e. guaranteed inroute bandwidth for a particular type of webcast) associated with individual terminals; dynamically planning the overall allocation of inroute bandwidth to the complete set of concurrently operating remote terminals giving first priority to static bandwidth requests, second priority to digitized voice traffic, third priority to web page downloading, and lower priority to all other applications such as email transfer (the plan preferably adapts to changing requirements quickly, yet avoids frequent retuning of remotes as each retuning may cause loss of communications for a short period while the inroute demodulators reachieve lock); composing instructions to the remote terminals to set the transmitter center frequency and data rate (i.e. bandwidth); providing route tuning instructions to the outbound router for transmission to the remote terminals; and providing route terminal assignment and tuning instructions to the inroute router and demodulator pairs. The teleport also preferably includes a plurality of inbound demodulators, one for each concurrently operating remote terminal. Note that this feature does not necessarily require an inbound demodulator for each remote terminal deployed, only for the maximum number that must be accommodated concurrently transmitting. One or more routers comprise a plurality of ports, one for each demodulator, including the following processes for each demodulator: monitoring one or more signal quality parameters of the signal such as, for example, carrier to noise ratio or energy per bit ratio; composing instructions to the remote terminal to command the transmit power up or down to maintain the teleport's receive signal in an acceptable range; providing a server side of the TCP/IP proxy process; providing communications with the inroute allocation computer, whereby the latter commands the inroute demodulator and router to expect the center frequency and data rate of the transmitter of the associated remote terminal. A router is preferably included to format outbound packets for the outbound modulator. The router is optionally configured to control the bandwidth on an individual, per-terminal basis, similar to the allocation of inroute bandwidth. Since the outroute bandwidth can be directed to any particular terminal on a packet-by-packet basis, and since webcasting generally imposes stringent requirements on inroute performance but is less dependent on outroute performance, this function is not as important as it is on the inroute. The teleport also preferably includes a single modulator to transmit the shared outbound channel; a high-gain dish antenna; a low-noise amplifier and downconverter; a transmit upconverter and high power amplifier; and an IP router with a connection to the terrestrial Internet.

It should be understood that other equipment, such as signal monitoring and test equipment may optionally be provided.

The following list identifies a preferred antenna pointing procedure, suitable for use with a webcasting apparatus and method according to the present invention. See also FIG. 3 and the related discussion below.
  a. Measure position using Global Positioning System (GPS) receiver.
  b. Calculate polarization and look angles for antenna.
  c. Ask user to set feedhorn polarization.
  d. Measure current magnetic azimuth using magnetic compass.
  e. If azimuth is more than 5 degrees from the calculated value, ask the user to rotate the case on the ground. Wait for azimuth to be within 2 degrees of calculated value.
  f. Using antenna attitude sensor, raise antenna to calculated look elevation.
  g. Sweep antenna through full range in azimuth, monitoring signal strength. Record peaks above minimum signal strength that could be a satellite. If receiver locks during this process, skip to step k.
  h. Position antenna on each detected peak in turn, holding the antenna stationary in each position for long enough for the receiver to lock (a few seconds). If receiver locks during this process, skip to step k.
  i. Position antenna on each detected peak in turn and peak antenna (see procedure below) on each peak. Then hold antenna stationary for long enough for the receiver to lock. If receiver locks during this process, skip to step k.
  j. If receiver will not lock or no peaks are detected, inform user of inability to find the satellite and stop.
  k. Peak antenna.
  l. Ask user for permission to transmit.
  m. Activate transmitter.
  n. Done.

The following list identifies a preferred antenna peaking procedure, suitable for use with a webcasting apparatus and method according to the present invention. Preferably, the steps identified below are performed an initial time for each axis, and then a second time for each axis. See also FIG. 4 and the related discussion below.
  a. Set a variable, Delta, to 1 degree.
  b. Measure signal strength.
  c. Move antenna Delta in the plus direction.
  d. Measure signal strength. If strength is now higher, go to step h.
  e. Move antenna 2*Delta in the minus direction.
  f. Measure signal strength. If strength is now higher, go to step h.
  g. Move antenna Delta in the plus direction.
  h. Divide Delta by two.
  i. If Delta is still more than the pointing precision of the antenna, go to step b.
  j. Done.

Figure 1:
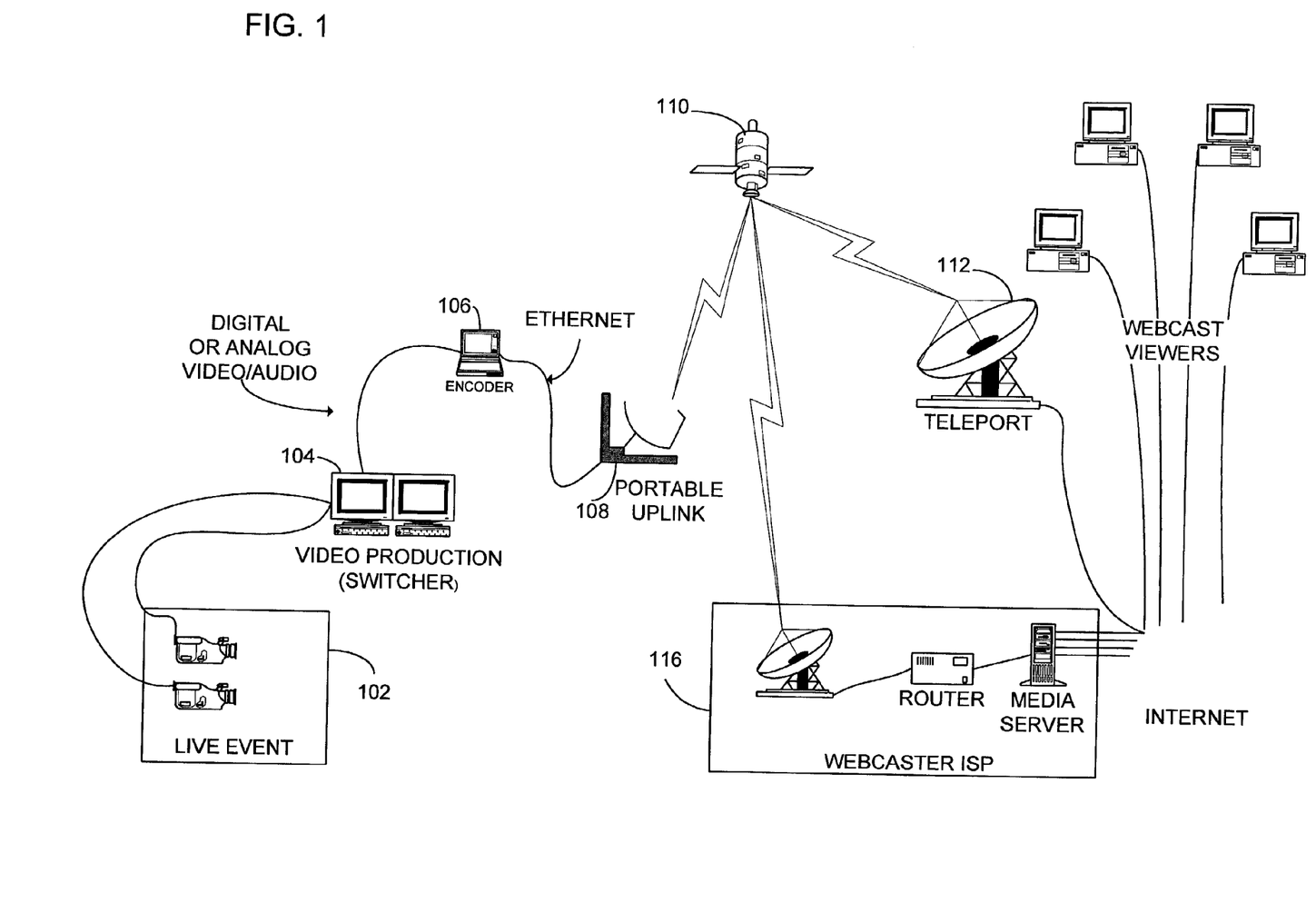
FIG. 1 is block diagram of a preferred webcasting system, suitable for use with the present invention.

Referring now to FIG. 1, an exemplary system-level block diagram illustrates a preferred embodiment of a webcasting system according to aspects of the present invention. Various devices 102, such as cameras and recording equipment, capture essentially real-time image and/or sound data (collectively referred to herein as multimedia data, captured multimedia or media content) associated with a live event that is the subject of the webcast. The captured multimedia data may be analog or digital or a combination of both depending upon, among other things, the devices 102. The multimedia data is input to a local video and/or audio production facility/unit 104 (e.g., a video switcher), the output of which is supplied to an encoder 106. As indicated on FIG. 1, the output from production unit 104 may comprise digital or analog video and/or audio. The encoder 106 may comprise, for example, a dedicated hardware encoder with capabilities substantially similar to the hardware and software requirements previously described herein, or a computer (e.g., a PC) operating encoding software. Preferably, encoder 106 also digitizes the captured multimedia if it is captured in analog form and not digitized prior to being provided to encoder 106. Further, the digital multimedia data is preferably converted to a known standard bitstream (e.g., REAL MEDIA), either by encoder 106 or by production unit 104 or by one of the capture devices 102.

It should now be appreciated that a bitstream of digital multimedia data exists at encoder 106. Encoder 106 transmits the bitstream to an uplink subsystem 108 (referred to herein as uplink 108), preferably over a wired or wireless Ethernet communication channel. Uplink 108 transmits the bitstream data to a communications satellite 110. Additional aspects of uplink 108 are discussed in connection with FIG. 2.

As illustrated in FIG. 1, once the bitstream is uplinked to the communications satellite 110, there are multiple data paths for transmitting the multimedia content. For example, in one embodiment, satellite 110 transmits (i.e., downlinks) the bitstream data to a teleport facility 112, equipped with a TCP proxy facility. Such a facility is available from Cislunar Networks. In a preferred embodiment, the bitstream is transmitted over the terrestrial Internet to a content distribution network or a webcast Internet Service Provider ("webcast ISP") which would provide the digital multimedia content to webcast viewers over the Internet.

In an alternate configuration, the teleport facility 112 itself is configured as the webcast ISP and directly provides the digital multimedia content to webcast viewers over the Internet as shown.

In a third embodiment, satellite 110 downlinks the bitstream multimedia data to a teleport facility 112, which thereafter uplinks the data to a satellite (e.g., the same satellite 110 or another satellite) which then retransmits the data to an independent webcast ISP. This independent webcast ISP would thereafter provide the digital multimedia content to webcast viewers over the Internet.

In yet another embodiment, satellite 110 downlinks the bitstream data directly to a webcast ISP 116. In this embodiment, the webcast ISP 116 is preferably configured with a router to accommodate the TCP proxy feature that would otherwise be addressed by teleport facility 112. This embodiment requires a high-gain antenna at the webcast ISP, which may be relatively costly.

Figure 2:
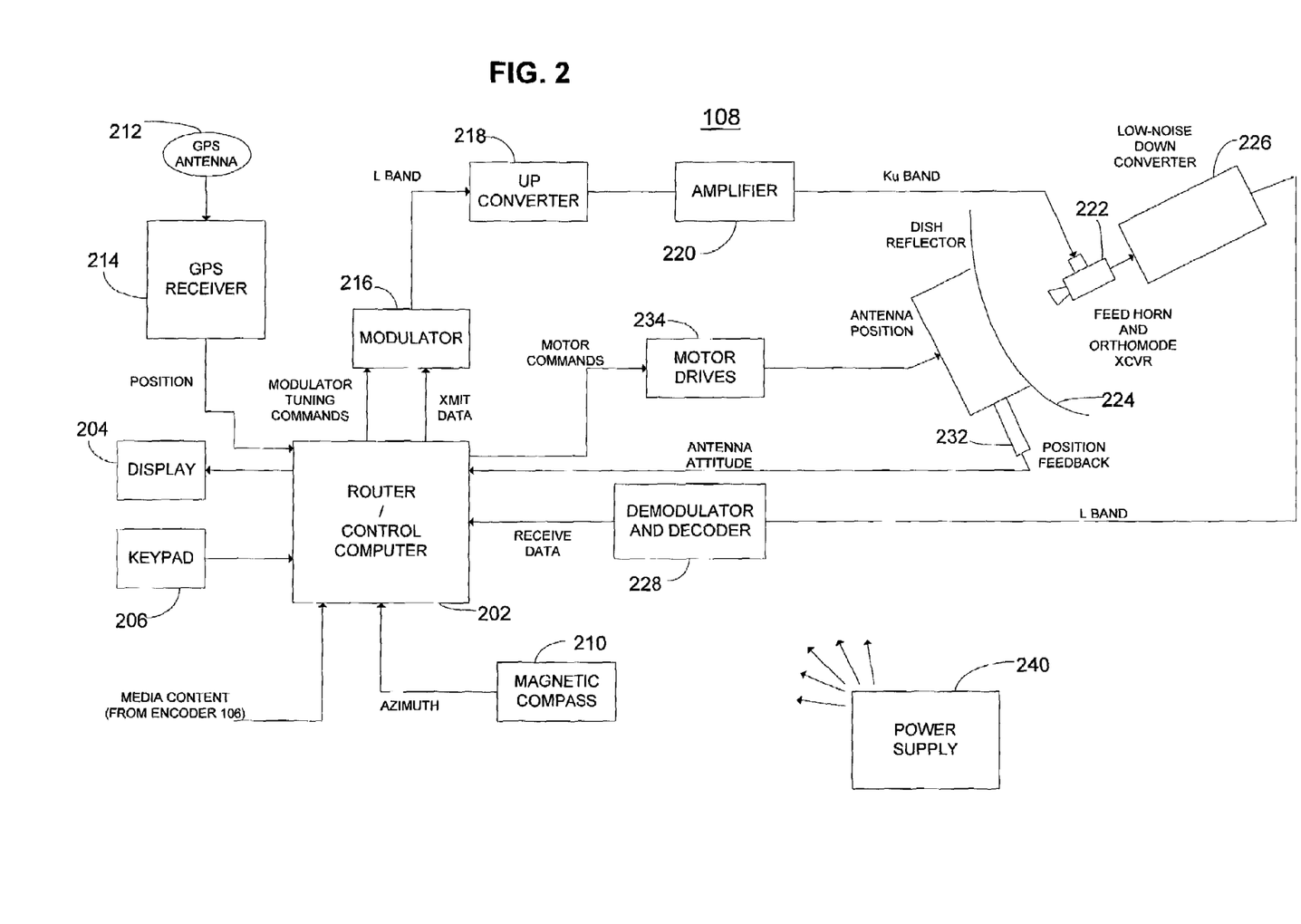
FIG. 2 is a block diagram of an uplink subsystem, suitable for use with the webcasting system of FIG. 1.

FIG. 2 is a block diagram of a preferred embodiment of uplink 108, suitable for use with the apparatus and method of the present invention. As indicated above, the hardware identified in FIG. 2 preferably resides in a single, portable case (not illustrated).

As can be appreciated from FIG. 2, uplink 108 preferably includes a number of components, each of which will now be described. A router computer 202 (also referred to as a control computer or control processor) provides command and control functionality at the webcasting site. A display 204 (e.g., a 4-line LCD display) connected to the router computer 202 provides control and feedback information to a system user. A keypad 206 (e.g., a 12-key keypad) connected to router computer 202 allows user input. The display 204 and keypad 206 may comprise a single unit. Optionally, router computer 202 is constructed and arranged to allow for control access via a remote computer (e.g., via a web browser).

A magnetic compass 210 preferably provides azimuth information to router computer 202. This azimuth data allows router computer 202 to gauge its orientation relative to magnetic North, which, as described above, facilitates positioning uplink 108 to establish communications with satellite 110 (FIG. 1). Similarly, a GPS antenna 212 and GPS receiver 214 provide position data to router computer 202. The operation of GPS systems is believed to be sufficiently understood in the art. Accordingly, a detailed discussion is not necessary here. It will be noted that the GPS receiver 214 provides position information of sufficient accuracy to permit router computer 202 to determine its present position on the Earth.

As described above, uplink 108 transmits webcast data packets to satellite 110. For transmission, a router computer 202 outputs such data packets to a modulator 216 that produces L Band data. An upconverter 218 then converts the data for satellite transmission in a conventional manner. Upconverters are generally known in the art and normally comprise a local oscillator, typically 13,050 MHZ for operating in the standard Ku band, a mixer, and associated filters. The upconverter mixes L-band input frequency from the modulator, which will typically be in the range of 950 to 1,450 MHZ, with the output of the local oscillator. The product contains the sum and difference frequencies of the two. Filters select the sum frequency in the Ku band uplink range of 14,000 to 14,500 MHZ for output to the high-power amplifier.

In the exemplary embodiment of FIG. 2, the up converter 218 supplies the converted data to a high-power amplifier 220 that provides the data (in Ku Band) to a feed horn/orthomode transceiver 222, which is coupled to a dish antenna 224. The transceiver 222, in connection with the amplifier 220 transmits the data to satellite 110, thus establishing an uplink channel. Modulator 216, upconverter 218, and amplifier 220 may be collectively referred to as a satellite data transmitter (or satellite communications signal converter) because they convert the webcast data to a form compatible for satellite transmission.

A downlink channel (between satellite 110 and router computer 202) includes the feed horn/orthomode transceiver 222, antenna 224, a low-noise down converter 226, and a demodulator/decoder 228. Data received at antenna 224 from satellite 110 is supplied to the down converter 226 which converts the received signal to L Band and provides the L Band signal to the demodulator/decoder 228. Demodulator/decoder 228 provides the received data to router computer 202.

Router computer 202 also provides motor commands to automatically control the position of dish antenna 224. Such control is provided as part of the antenna pointing and peaking procedure described in greater detail above. Router computer 202 determines a desired antenna position based on magnetic azimuth signals provided by magnetic compass 210, and based on position information provided by GPS receiver 214. Router computer also receives current antenna pointing information via attitude sensors 232 coupled to antenna 224. Based on the difference between the desired antenna position and the current pointing information, router computer 202 provides motor commands to one or more positioning motors 234 coupled to antenna 224.

As shown in FIG. 2, preferably a single electronics power supply 240 provides power to the illustrated components of uplink 108.

Router computer 202 preferably executes a TCP/IP proxy process that makes the uplink channel insensitive to the relatively long propagation delays associated with satellite transmission of the webcast bitstream data. Encoder 106 preferably supplies the media content to be webcast over the satellite in one of the various commercially available media formats (e.g., WINDOWS MEDIA or REAL MEDIA or QUICKTIME). Many such media formats use protocols, such as TCP, that are sensitive to propagation delays. This is understood in the art. As discussed above, with such protocols, a system of acknowledgments and retransmissions is used to minimize the chances that a given data packet is lost. The relatively long propagation delays associated with satellite communications can confuse this acknowledgment and retransmission process. In order to avoid such problems without simply reducing the data transfer rate itself, router computer 202 advantageously provides an endpoint of the TCP circuit on the uplink side. In other words, any acknowledgments and retransmissions required are provided between router computer 202 and encoder 106. The data packets actually transmitted over the satellite communication link use a protocol that is insensitive to the propagation delays of typical satellite communications (e.g., 500 ms round trip). Insensitive is used here to differentiate from a protocol that would be confused and intolerant of the long propagation delays common with satellite communications. A symmetrical process is employed on the downlink side. In other words, a terrestrial receiving station (e.g., webcaster ISP 116) receives the "raw" downlinked data and reformats the data stream to one of the original media formats and supplies the necessary handshaking (acknowledgments and retransmissions) to a media server that places the content onto the Internet as shown in FIG. 1.

It should now be appreciated that one preferred embodiment of the present invention includes an encoder (e.g., encoder 106) providing a first digital webcast signal in a first webcast format that is relatively sensitive to propagation delays associated with long communication channels, such as satellite transmission channels. This first webcast format follows a standard TCP protocol and, therefore, requires the selective provision of acknowledgment messages to ensure no loss of transmission packets. An uplink router (e.g., uplink 108) receives the first digital webcast signal and provides any necessary handshaking/acknowledgment messages to the encoder such that the encoder operates as if the TCP circuit is complete. The uplink router converts the first digital webcast signal to a second digital webcast signal that is not sensitive to the propagation delays associated with long communication channels. Standard satellite uplink equipment (e.g., the combination of modulator 216, up converter 218, and amplifier 220) receives the second digital webcast signal and uplinks it to a satellite a form compatible with satellite communications, as illustrated and discussed with respect to FIG. 2. The satellite downlinks the signal for reception on earth. An earth-based receiving facility (e.g., Teleport 112 or webcast ISP 116) receives the downlinked signal and converts it into a third digital webcast signal that is compatible with the first webcast format (e.g., follows a standard TCP protocol). The earth-based facility thereafter re-transmits the third digital webcast signal over a wide area network (e.g., the Internet) for viewing by webcast subscribers. The earth-based facility provides the necessary TCP handshaking (e.g., acknowledgment messages) in a process that is symmetrical to that of the uplink router on the uplink side.

Figure 3:
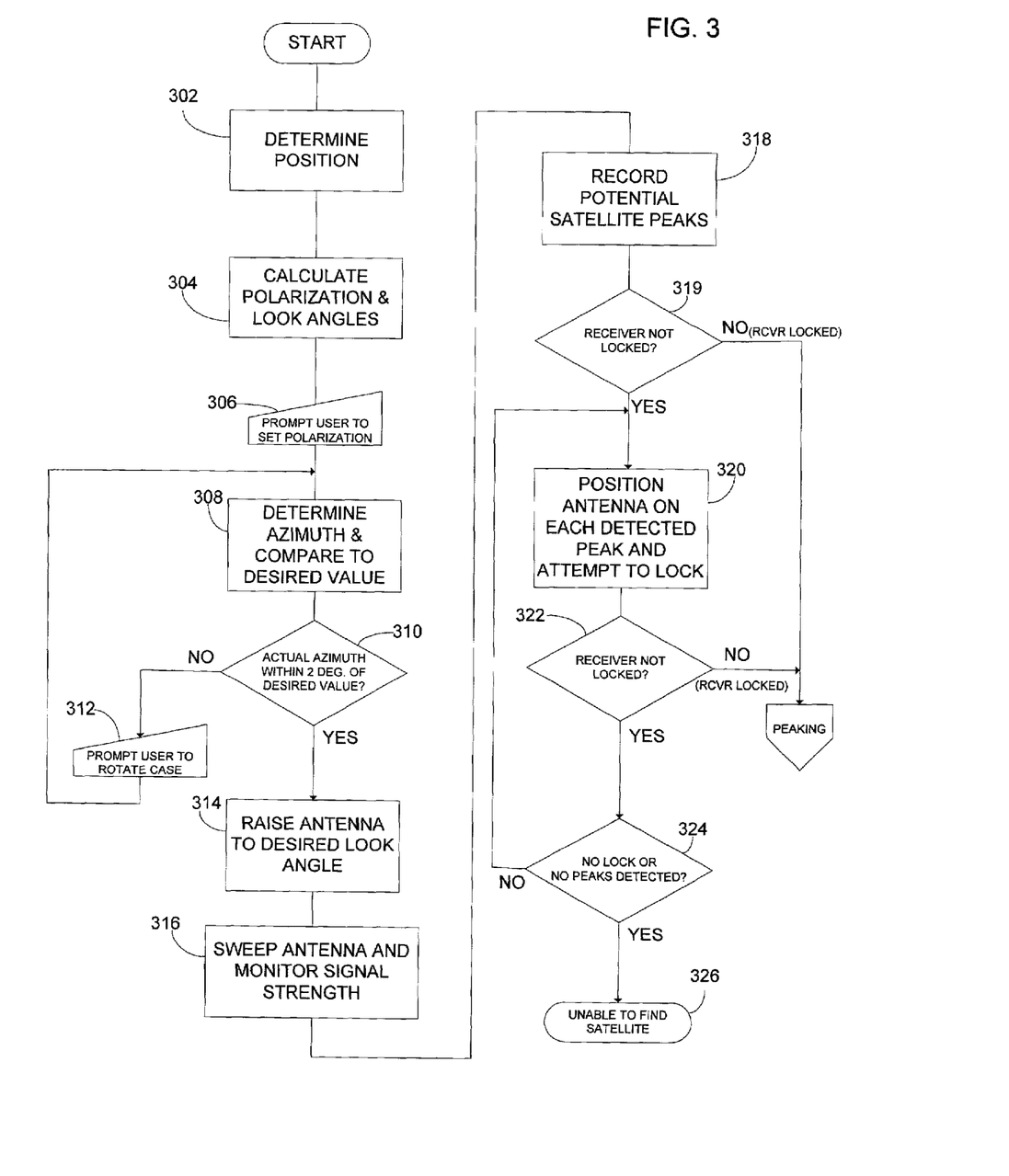
FIG. 3 is a flow chart illustrating aspects of a preferred automated antenna pointing process suitable for use with the webcasting system of FIG. 1.
Figure 4:
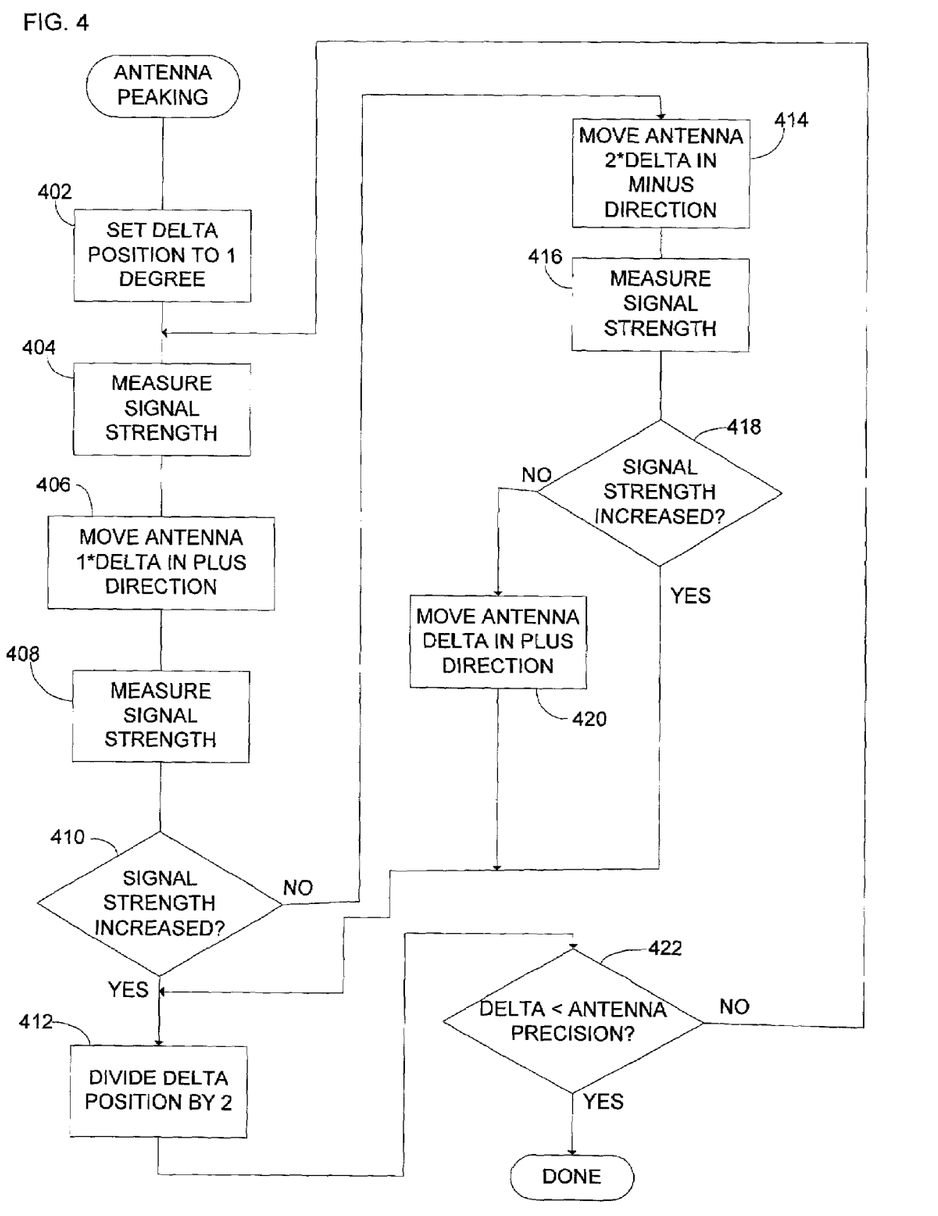
FIG. 4 is a flow chart illustrating aspects of a preferred automated antenna peaking process suitable for use in connection with the antenna pointing process of FIG. 3.

FIGS. 3 and 4 illustrate a preferred automated antenna pointing and peaking process. Referring first to FIG. 3, at step 302, router computer 202 determines the current position of uplink 108 by reference to position data provided by GPS receiver 214. Router computer 202 also determines desired polarization and look angles based on a desired satellite location (step 304). Based upon the determined polarization, at step 306 router computer 202 prompts the user, via display 204, to set the polarization for feedhorn 212. Router computer 202 also determines the current magnetic azimuth available from compass 210 and compares the determined azimuth with a calculated value for the desired satellite location (step 308). If the determined actual azimuth exceeds the desired value by more than an upper tolerance limit (e.g., five degrees), at step 312 router computer 202 prompts the user to rotate the uplink (i.e., the case housing uplink 108) in one direction or the other (step 310). This process (steps 308, 310, 312) is preferably repeated until the determined actual azimuth is within a lower tolerance limit (e.g., 2 degrees) of the desired value.

With uplink 108 positioned correctly with respect to azimuth, at step 314 router computer 202 determines a desired antenna altitude (elevation) position and commands antenna 224 to the desired position by providing appropriate motor commands to motor drives 234. At step 316, router computer 202 drives antenna 224 such that it sweeps through its full azimuth range. While antenna 224 is so sweeping, router computer 202 monitors signal strength received in the downlink channel (i.e., via downlink converter 226 and demodulator/decoder 228). At steps 318–326, router computer 202 records signal peaks received above a threshold minimum level. The minimum threshold relates to sky noise and low-noise-block-downconverter noise, and the absolute value of this threshold depends on the gain levels in this equipment. It should generally be set so that the threshold corresponds to a signal-to-noise ration of about 3 dB. Such signal peaks are considered to be potential satellite signals. If the receiver locks during this time, the uplink position and satellite location aspects of the process are terminated and a peaking process is initiated (FIG. 4). If, however, there is no lock, router computer 202 positions the antenna on each detected signal peak, holding the antenna in each position for a period sufficient to allow the receiver to lock (e.g., a few seconds). If the receiver locks, the process proceeds to the peaking process. If, after positioning the antenna at each detected signal peak no lock is achieved, router computer again positions the antenna on each detected signal peak and executes a peaking procedure (see FIG. 4) to attempt to achieve a lock with the desired satellite. If the receiver locks, the process completes the peaking process. If uplink 108 is unable to lock-up with the satellite, the user is given a prompt indicated that the system was unable to find a satellite.

After the peaking process is complete, the system prompts the user for permission to transmit. Upon an acceptable input response from the user, the transmitter is activated.

FIG. 4 illustrates a preferred antenna peaking procedure for peaking the antenna after the receiver of transceiver 212 achieves lock. As indicated above, for improved accuracy, the peaking procedure is preferably performed for each axis an initial time and a second time. At steps 402 and 404, router computer 202 initializes a peaking position variable ("delta") to an initial value (e.g., one degree) and measures signal strength. At steps 406 and 408 router computer 202 finely adjusts the antenna position (via motor drives 234) by a value of 1 delta (1*delta) in the positive direction and again measures signal strength. As illustrated by steps 410 and 412, if the signal strength improves (increases), the peaking position variable is decreased (e.g., divided by two). If, however, the signal strength does not improve, at steps 414 and 416 router computer 202 finely adjusts the antenna position in the negative direction (e.g., 2*delta in negative direction) and again measures signal strength. As illustrated by step 418, if signal strength improves at this point, the peaking position variable is decreased (step 412). If the signal strength does not improve, router computer 202 moves the antenna in the positive direction by one delta (1*delta) (step 420) and thereafter reduces the value of delta (step 412).

After each time the value of delta is reduced (i.e., after step 412 in FIG. 4), router computer 202 determines if the reduced value of delta is less than the antenna precision (step 422). In other words, if delta becomes smaller than the increment size over which router computer can adjust the pointing angle of the antenna, the peaking procedure is halted. If, however, the value of delta is greater than the antenna precision, the peaking process returns to step 404 and repeats until such a time that the value of delta is less than the antenna precision.

Figure 5:
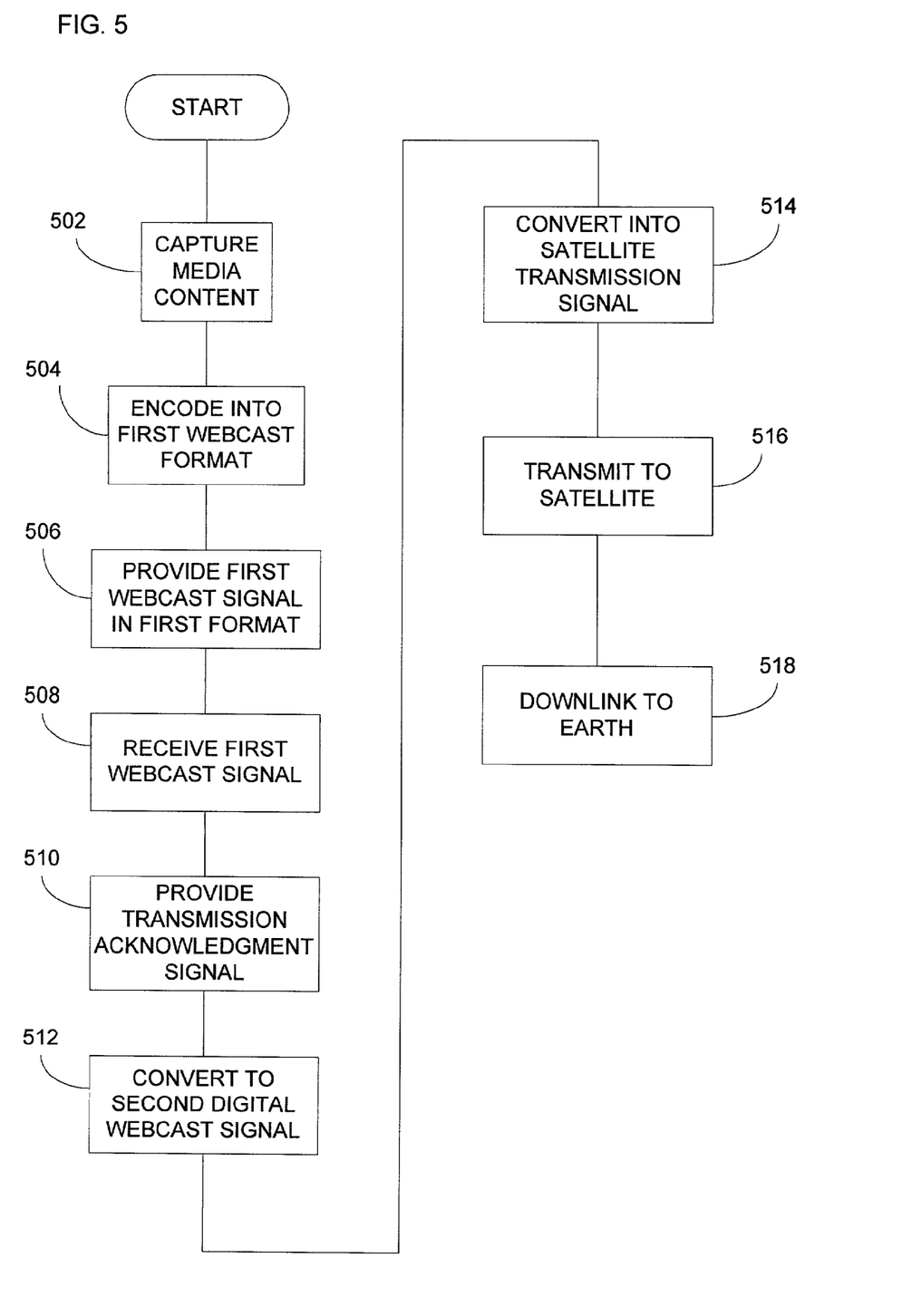
FIG. 5 is a flow chart illustrating a preferred process for webcasting a live event in accordance with aspects of the present invention.

FIG. 5 is a flowchart that illustrates a process for webcasting from a remote venue in accordance with aspects of a preferred embodiment of the invention. At step 502, media content, such as live video and/or audio is captured at an event to be webcast. The media content is preferably captured in either digital form or digitized after being captured at the event. At steps 504 and 506, the captured digital media content is encoded into a first webcast format and a bitstream is made available. For example, as shown in FIG. 1, encoder 106 preferably encodes the digital media content into a standard webcast format (e.g., a TCP format that requires selective provision of transmission acknowledgment signals). In other words, encoder 106 provides a bitstream signal in the desired webcast format. As discussed above, such a format typically requires some form of handshaking and is sensitive to transmission propagation delays. At steps 508 and 510, the first webcast signal is received and any necessary handshaking is provided, including any required transmission acknowledgment signals. As illustrated in the preferred embodiment depicted in FIG. 1, portable uplink 108 receives the first webcast signal and provides the necessary handshaking to encoder 106 to complete a TCP circuit. At steps 512 through 516, the first webcast signal is converted into a second webcast signal that has a format/protocol that is insensitive to the transmission propagation delays associated with a typical satellite communication link. The second webcast signal is then converted to a form suitable for satellite transmission (e.g., modulated, amplified, and converted to the appropriate frequency band). In the preferred system depicted in FIG. 1, uplink 108 performs steps 512 through 516. Step 518 reflects the transmission by the communication satellite back to Earth for reception and distribution (which, as explained above can include retransmission to the same or another satellite). A matching process is preferably used on the downlink side to convert the downlinked signal to a standard webcast format for distribution via the Internet or other suitable wide area networks.

An Appendix is attached hereto. The Appendix identifies various characteristics, including hardware characteristics, of particular aspects of embodiments of the present invention. The Appendix also includes exemplary C source code associated with the look angles and feedhorn polarization calculations referred to above and in FIG. 3.

As can be appreciated, various embodiments of the invention are possible, the foregoing webcasting implementation being identified for exemplary disclosure purposes only. The present invention also finds application as a means for portable Internet access. Thus, although it is believed that live webcasting provides a best mode for employing the invention, the invention is not limited to webcasting applications. It should also be understood that the invention generally includes a novel combination of elements and features. Some of the elements/features are currently known in the art and, accordingly, are only briefly described herein.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense. It is further to be understood that the steps described herein are not to be construed as necessarily requiring their performance in the particular order discussed or illustrated. It is also to be understood that additional or alternative steps may be employed with the present invention.

APPENDIX

A commercial apparatus and system embodying aspects of the present invention has been operated and tested in actual live webcasting environments. In one case, the system webcast a local football game, streaming concurring 320K, 100K, 34K, 29K, and 17K video and audio streams for four hours without dropping a packet. The following paragraphs describe this apparatus and system.

The portable uplink includes automatic aiming and peaking of the antenna, as described above. Bandwidth is automatically assigned from a hub station. The portable uplink is housed in an integrated transit case built to Air Transportation Association (ATA) standards, and can be unloaded and rolled into position by two people. Preferably, a portable application can be on-line in less than ten minutes from being deployed, providing voice and data connectivity.

A satellite router may be used at the Internet Service Provider (ISP). A proprietary router suitable for use with the present invention is offered under the trade name MOONBEAMER, available from Cislunar Networks, of Joplin, Mo. The MOONBEAMER satellite router incorporates the functions of an Internet protocol satellite transceiver, router, caching proxy server, video-on-demand server, web server, and email server in a single unit. When combined with, for example, wireless Ethernet or dial-up PPP servers, the MOONBEAMER provides core functionality (e.g., Internet in-a-box) for rapid ISP deployment. If PPP or wireless servers are chosen with Radius compatibility, the MOONBEAMER can provide the authentication server with the user authorization database being maintained at a central site. There is preferably a MOONBEAMER integrated into the remote terminal at the webcast venue. There need not be a MOONBEAMER at the teleport. However, when it is desirable to broadcast directly to a webcasting ISP, a MOONBEAMER may be used at the ISP location to receive the signal, handle the receiving end of the TCP proxy, and route the packets onto the local area network of the ISP.

Preferably, the satellite router is designed for reliable, unattended operation. The operating firmware of the MOONBEAMER runs from flash memory (not a mechanical disk). A hard disk may be used for optional cache, web, video, and email servers. Preferably, a watchdog system (e.g., timer) automatically restarts the router in the event of a lockup. Further, the satellite router preferably provides key operational parameters to the Teleport, including receiver performance, temperature, and fan filter status. As such, potential maintenance issues (e.g., excess vegetation obscuring the antenna) are identified early. It is also preferable to allow the Teleport facility to remotely, and individually, control the power level of each satellite transmitter employed. This permits, among other things, adjustments for local weather conditions.

Table I identifies certain specifications of the MOONBEAMER described above.

TABLE I

| | |
|---|---|
| Terrestrial Interface | Four Ports 10/100BASET Ethernet |
| Inroute Data Rate (terminal to Internet) | 2 Megabits per second |
| Outroute Data Rate (Internet to terminal) | 40 Megabits per second |
| Power | 120 VAC 50/60 Hz, 200 W |
| Dimensions | 16 × 11 × 9 inches (wall/shelf mount) (4U 19" rack module - alternative) |

The optional terrestrial interfaces available for the MOONBEAMER include: (1) RS232 serial; (2) RS422 serial; (3) analog (composite or Y/C) video output; and (4) loop-start analog telephone jacks. Optional integrated server components/features include: (1) caching web proxy with multicast peering; (2) web server; (3) video on demand; (4) email server; (5) BOOTP/DHCP with subscriber authorization features; (6) Teleport-based Radius authentication.

Table II identifies certain specifications of a commercial embodiment of the portable uplink 108 (FIG. 1), having the trade name BEAM BOX.

TABLE II

| | |
|---|---|
| Controls and Displays | 12-key keypad, with 4-line LCD display (optional - control access via web browser interface) |
| Dimensions | 26 × 52 × 69 inches (including casters) |
| Weight | Approximately 250 pounds |
| Power | 500 W (including power required by MOONBEAMER) |
| Wireless Option | Integrated 802.11(b) wireless Ethernet |

| ANTENNA LOOK ANGLES AND FEEDHORN POLARIZATION |
|---|

```
/*
 * 'C' code to calculate antenna look angles and feedhorn polarization.
 * Not intended as a complete program, but includes all the necessary
 * calculations for inclusion in a complete, application-specific program.
 */
/* Inputs */
float SatelliteLongitude;
float AntennaLongitude;
float AntennaLatitude;
/* Outputs */
float LookElevation;
float LookAzimuth;
float Polatization;
/* Internal variables */
float Gamma,S,Alpha;
#define PI 3.14159265358979
#define Degrees(Radians) ((Radians) * 180.0 / PI)
#define Radians(Degrees) ((Degrees) * PI / 180.0)
void Calculations(void)
{
    if (AntennaLatitude > 89.9 || AntennaLatitude < -89.9) {
        Polarization = 0.0;  /* at N or S pole */
    } else if (fabs(sin(Radians(AntennaLongitude - SatLong))) < 0.001) {
        Polarization = 0.0;  /* same longitude as satellite */
        /* note that if AntennaLatitude is also 0, we are at sub-satellite point,
            el=90, and polarization depends on az, which is arbitrary.
            I assume az=0 */
    } else {
        Polarization = Degrees(atan(sin(Radians(AntennaLongitude - SatLong)) /
tan(Radians(AntennaLatitude)) ));
    }
    Gamma = Degrees(acos( cos(Radians(AntennaLatitude)) * cos(Radians( AntennaLongitude
- SatelliteLongitude))));
    S = ( AntennaLatitude + AntennaLongitude - SatelliteLongitude + Gamma) / 2.0;
    Alpha = Degrees(atan( sqrt( sin(Radians( S - Gamma)) * sin(Radians( S - AntennaLatitude))
/
        sin( Radians(S)) / sin(Radians( S + SatelliteAntennaLongitude - AntennaLongitude)))) * 2);
    LookElevation = Degrees(acos( sin( Radians(Gamma)) / sqrt( 1 + pow( rEO, 2) -
        2 * rEO * cos(Radians(Gamma)))));
    if (LookElevation > 180.0) {
        LookEl -= 360.0;
    }
    if (SatelliteLongitude > AntennaLongitude) {
        Alpha = -Alpha;
    }
    LookAzimuth = 180 + Alpha;
}
```

What is claimed is:

1. A portable satellite uplink for use in connection with a webcasting system for capturing live media content at a first location and webcasting the live media content to a second location, said webcasting system including a satellite communication link having a transmission propagation delay, a communication satellite, an encoder encoding the live media content into a first digital webcast format at the first location, said first digital webcast format being sensitive to the transmission propagation delay and requiring at least one transmission acknowledgement signal, the portable satellite uplink comprising:

a control processor receiving the live media content in the first digital webcast format and providing the at least one transmission acknowledgement signal to the encoder, said control processor converting the live media content to a second digital webcast format having a characteristic such that the second digital webcast format is insensitive to the transmission propagation delay;

a satellite communication signal converter receiving the live media content in the second digital webcast format, said satellite communications signal converter converting the live media content received in the second digital webcast format to a satellite transmission signal compatible with the satellite communication link; and a satellite uplink transceiver receiving the satellite transmission signal and transmitting the satellite transmission signal to the satellite over the satellite communication link wherein the satellite downlinks the satellite transmission signal for reception on the earth at the second location, said satellite uplink transceiver comprising:

an antenna for directing the satellite transmission signal;

at least one motor for positioning the antenna;

an antenna controller responsive to a global positioning satellite system and an electronic compass for estimating a direction to a satellite and providing a motor command corresponding to the estimated direction, said motor being responsive to the motor command for positioning the antenna to direct the satellite transmission signal in the estimated direction, said antenna controller further being configured for, after estimating the direction, measuring a signal strength of the communications link established with the satellite and providing the motor command to position the antenna for optimizing reception of the transmission signal at the satellite; and wherein the portable satellite uplink is responsive to a teleport for setting a transmitter center frequency and data rate, said center frequency and data rate defining a bandwidth for transmissions to the satellite to manage transmissions from a plurality of portable satellite uplinks to the satellite and wherein the portable satellite uplink adjusts the power with which the satellite transmission signal is transmitted in response to input from the teleport.

2. The portable satellite uplink of claim 1 wherein the first digital webcast format utilizes a TCP protocol having a first propagation delay tolerance less than the propagation delay of the satellite communication link and wherein the satellite uplink acts as a TCP endpoint such that the second digital webcast format is insensitive to the propagation delay.

3. The portable satellite uplink of claim 2 wherein the second digital webcast format comprises a modified TCP protocol having a second propagation delay tolerance in excess of the propagation delay.

4. The portable satellite uplink of claim 1 wherein the antenna controller provides the motor command such that the antenna sweeps a range of directions and the antenna controller identifies the directions of a plurality of satellites and estimates the direction to a satellite to be the direction of the satellite having the best measured signal strength.

5. A webcasting system for webcasting live media content over a satellite communication link having a transmission propagation delay and including a communication satellite, said webcasting system comprising:

an encoder at a first location encoding said live media content into a first digital webcast signal having a first digital webcast format that is sensitive to the transmission propagation delay, said encoder requiring receipt of at least one transmission acknowledgment signal; and a portable uplink router at the first location, said portable uplink router being responsive to a teleport for setting a transmitter center frequency and data rate, said center frequency and data rate defining a bandwidth for transmissions to a particular satellite to manage transmissions from a plurality of portable satellite uplinks to the satellite, said portable uplink router comprising:

a control processor receiving the first digital webcast signal and providing the at least one transmission acknowledgment signal to the encoder, said control processor converting the first digital webcast signal to a second digital webcast signal being insensitive to the transmission propagation delay;

a satellite communications signal converter receiving the second digital webcast signal, said satellite communications signal converter converting the second digital webcast signal into a satellite transmission signal; and a satellite uplink transceiver receiving the satellite transmission signal and transmitting the satellite transmission signal to the satellite such that the satellite downlinks the satellite transmission signal for reception on the earth at a second location different from the first location;

and wherein the webcasting system adjusts the power with which the satellite transmission signal is transmitted in response to input from the teleport.

6. The webcasting system of claim 5 further comprising:
an earth station in electronic communication with the satellite, said earth station receiving the satellite transmission signal and converting the satellite transmission signal in to a third digital webcast signal having the first digital webcast format; and a router receiving the third digital webcast signal and routing the third digital webcast signal to a wide area network.

7. The webcasting system of claim 5 wherein the webcasting system further comprises:

an antenna for directing the satellite transmission signal;
at least one motor for positioning the antenna; and
an antenna controller responsive to a global positioning satellite system and an electronic compass for estimating a direction to a satellite and providing a motor command corresponding to the estimated direction, said motor being responsive to the motor command for positioning the antenna to direct the satellite transmission signal in the estimated direction, said antenna controller further being configured for, after estimating the direction, measuring a signal strength of the communications link established with the satellite and providing the motor command to position the antenna for optimizing reception of the transmission signal at the satellite.

8. The webcasting system of claim 7 wherein the antenna controller provides the motor command to cause the antenna to sweep a range of directions, identifies the directions of a plurality of satellites, and estimates the direction to a satellite to be the direction of the satellite having the best measured signal strength.

9. A method of webcasting live media content over a satellite communication link having a transmission propagation delay and including a communication satellite, said method comprising:

encoding said live media content at a first location into a first digital webcast signal having a first digital webcast format that is sensitive to the transmission propagation delay, said first digital webcast format requiring receipt of at least one transmission acknowledgment signal;

uplinking the encoded media content from the first location across the satellite communication link by an uplink method comprising:

receiving the first digital webcast signal;
providing the at least one transmission acknowledgment signal required by the first digital webcast format;

converting the first digital webcast signal to a second digital webcast signal being insensitive to the transmission propagation delay of the satellite communication link;

converting the second digital webcast signal into a satellite transmission signal;

receiving positional data from a global positioning satellite system and an electronic compass;

estimating a direction of the communication satellite based on the received positional data;

providing a motor command corresponding to the estimated direction of the communication satellite;

receiving the motor command at an antenna positioning motor, wherein the antenna positioning motor is responsive to the motor command for pointing an antenna such that the antenna pointed by the antenna pointing motor directs the satellite transmission signal in the estimated direction of the communication satellite;

establishing the satellite communications link;

measuring a signal strength of the satellite communications link;

optimizing reception of the satellite transmission signal at the satellite; and transmitting the satellite transmission signal from the first location to the communication satellite;

downlinking the satellite transmission signal for reception on the earth at a second location different from the first location;

setting, in response to input from a teleport, a transmitter center frequency and data rate, said center frequency and data rate comprising a bandwidth for transmissions to a satellite to manage transmissions from a plurality of portable satellite uplinks to the satellite; and adjusting the power with which the satellite transmission signal is transmitted in response to input from the teleport.

10. One or more computer-readable media having computer-executable instructions for performing the method of claim 9.

11. The method of claim 9 further comprising:

receiving the satellite transmission signal on earth;

converting the satellite transmission signal to the first digital webcast format;

providing a third digital webcast signal to at least one user, wherein the third digital webcast signal has the first digital webcast format;

decoding the third digital webcast signal; and rendering the live media content to the user from the decoded third digital webcast signal.

* * * * *